(12) United States Patent
Park et al.

(10) Patent No.: US 10,214,274 B2
(45) Date of Patent: Feb. 26, 2019

(54) BALLAST WATER TREATMENT OPERATING APPARATUS AND METHOD

(71) Applicant: TECHCROSS CO., LTD., Seoul (KR)

(72) Inventors: Kyu Won Park, Busan (KR); Seong Tae Kim, Chungcheongnam-do (KR); Hai Don Lee, Gyeonggi-do (KR); Yong Seok Park, Gyeonggi-do (KR); Gwang Ho Lee, Chungcheongnam-do (KR); Eun Kyu Park, Gyeonggi-do (KR)

(73) Assignee: TECHCROSS CO. LTD., Seoul (KR)

( * ) Notice: Subject to any disclaimer, the term of this patent is extended or adjusted under 35 U.S.C. 154(b) by 263 days.

(21) Appl. No.: 15/090,822

(22) Filed: Apr. 5, 2016

(65) Prior Publication Data

US 2017/0283028 A1    Oct. 5, 2017

(51) Int. Cl.
| | | |
|---|---|---|
| *C02F 1/32* | (2006.01) | |
| *B63J 4/00* | (2006.01) | |
| *C02F 1/00* | (2006.01) | |
| *G01S 19/10* | (2010.01) | |
| C02F 1/467 | (2006.01) | |
| C02F 103/00 | (2006.01) | |
| B63J 99/00 | (2009.01) | |

(52) U.S. Cl.
CPC ............. *B63J 4/002* (2013.01); *C02F 1/008* (2013.01); *G01S 19/10* (2013.01); *B63J 2099/006* (2013.01); *C02F 1/32* (2013.01); *C02F 1/4672* (2013.01); *C02F 2103/008* (2013.01); *C02F 2209/006* (2013.01); *C02F 2209/008* (2013.01); *C02F 2209/40* (2013.01); *C02F 2303/18* (2013.01)

(58) Field of Classification Search
CPC ...... B63J 4/002; B63J 99/00; B63J 2099/006; B63J 4/00; C02F 1/46104; C02F 1/008; C02F 1/66; C02F 1/32; C02F 1/4672; C02F 2103/008; C02F 2201/4612; C02F 2209/006; C02F 1/00; G01S 19/10
See application file for complete search history.

(56) References Cited

U.S. PATENT DOCUMENTS

| | | | | |
|---|---|---|---|---|
| 2008/0277354 | A1* | 11/2008 | Baerheim | B63J 4/002 210/750 |
| 2011/0114569 | A1* | 5/2011 | Kim | C02F 1/4674 210/739 |

FOREIGN PATENT DOCUMENTS

| | | | |
|---|---|---|---|
| KR | 20130127636 A | * | 11/2013 |
| KR | 101374046 B1 | * | 3/2014 |

* cited by examiner

*Primary Examiner* — Walter D. Griffin
*Assistant Examiner* — Cameron J Allen
(74) *Attorney, Agent, or Firm* — Nixon & Vanderhye P.C.

(57) ABSTRACT

A ballast water treatment operating apparatus includes a ballast water treatment unit for performing a certain treatment of ballast water flowing in from the outside for a ballast operation or performing a certain treatment of ballast water discharged into the outside for a de-ballast operation; a positional information receiving unit for receiving positional information; a control unit for confirming a ship's position by using positional information received from the positional information receiving unit and then determining whether to operate the ballast water treatment unit during a ballast operation or during a de-ballast operation, thereby being capable of preventing an unnecessary energy consumption.

14 Claims, 4 Drawing Sheets

BALLAST WATER TREATMENT OPERATING APPARATUS AND METHOD

BACKGROUND OF THE INVENTION

Field of the Invention

The present invention relates to a ballast water treatment operating apparatus and method and particularly to a ballast water treatment operating apparatus and method for determining whether to operate a ballast water treatment by using positional information of a global positioning system (GPS).

Description of the Related Art

Ships carrying cargo at sea in most cases sail in the state of a full load of cargo thereof and then unload cargo, and come back again with empty load. In case ships return with empty load like this, they start sailing after filled with ballast water by introducing it into the inside of the ships for the ship's balance, stability, maneuverability improvement and the like.

At this time, ballast water is filled in one port by means of the ballasting operation, then transferred to another port and discharged in the new port by means of the deballasting operation. Like this, as ballast water containing marine organisms and pathogens which is transferred from a long distance away is discharged, such a discharge may cause adverse effects disturbing the marine environment and ecosystem. Thus, the International Maritime Organism (IMO) has recently enacted the ballast water treatment regulation to prevent the disturbance of the environment and ecosystem.

To remove danger caused by marine organisms and pathogens, ballast water treatment devices which electrolyze ballast water or sterilize it by injecting chemicals or by ultraviolet light, are generally used in ships. However, since ballast water entered into the ballast water tank or discharged from the ballast water tank is of a large capacity, the high power consumption is caused whenever such a treatment is done.

SUMMARY OF THE INVENTION

To solve the above mentioned problem, the present invention has an object to provide a ballast water treatment operating apparatus and method which determine whether to operate a ballast water treatment by using positional information of GPS.

So as to obtain the object described above, a ballast water treatment operating apparatus according to one embodiment of the present invention may comprise: a ballast water treatment unit for performing a certain treatment of a ballast water flowing in from the outside for a ballast operation or performing a certain treatment of ballast water discharged into the outside for a de-ballast operation; a positional information receiving unit for receiving positional information; and a control unit for confirming a ship's position by using positional information received from the positional information receiving unit and then determining whether to operate the ballast water treatment unit during the ballast operation or during the de-ballast operation.

In a further embodiment, the control unit may further comprise a memory for storing a position to perform the ballast operation, and wherein the control unit may store in the memory the position to perform the ballast operation during the ballast operation and, in consideration of a ballast operation performing area stored in the memory at the time of the ballast operation, may determine whether to operate the ballast water treatment unit.

In a further embodiment, an operational condition of the ballast water treatment unit required during the ballast operation or during the de-ballast operation may be stored in the memory, and wherein the control unit may be configured to determine whether to operate the ballast water treatment unit according to the operational condition stored in the memory during the ballast operation or during the de-ballast operation.

In a further embodiment, if an updated operational condition of the ballast water treatment unit is inputted via the positional information receiving unit, the control unit may be configured to store the updated operational condition of the ballast water treatment unit in the memory.

In a further embodiment, the ballast water treatment unit may comprise an electrolysis unit for being capable of electrolyzing the ballast water flowing in from the outside during the ballast operation; and a neutralization unit for neutralizing residual oxidants remaining in ballast water discharged into the outside during the de-ballast operation, and wherein the control unit may be configured to control the electrolysis unit by determining whether to operate the electrolysis unit during the ballast operation and may be also configured to control the neutralization unit by determining whether to operate the neutralization unit during the de-ballast operation.

In a further embodiment, the ballast water treatment unit may comprise an ultraviolet treatment unit for performing an ultraviolet sterilization treatment of ballast water flowing in from the outside during the ballast operation or of ballast water discharged into the outside during the de-ballast operation, and wherein the control unit may be configured to control the ultraviolet treatment unit by determining whether to operate the ultraviolet treatment unit during a ballast operation and during a de-ballast operation.

So as to obtain the object described above, a ballast water treatment operating method according to another embodiment of the present invention may comprise the steps of: receiving a first positional information from a positional information receiving unit if a ballast operating button is inputted via a user inputting unit; storing in a memory the first positional information received from the positional information receiving unit at the step of receiving the first positional information; confirming whether positional information as to a position to perform a de-ballast operation via the user inputting unit is inputted; and performing a certain treatment of ballast water flowing in from the outside by operating a ballast water treatment unit if the positional information inputted at the confirmation step satisfies an operational condition of the ballast water treatment unit.

In a further embodiment, the method may further comprise the steps of: receiving a second positional information from the positional information receiving unit if a de-ballast operating button is inputted via a user inputting unit; and performing a certain treatment of ballast water discharged into the outside by operating the ballast water treatment unit if an operational condition of the ballast water treatment unit is satisfied in consideration of the second positional information received from the positional information receiving unit at the second positional information receipt step and the first positional information stored in the memory.

According to the above configuration, the present invention can prevent a needless energy consumption by determining whether to operate a ballast water treatment based on positional information.

In addition, the present invention can determine whether to treat ballast water according to a deballasting operation performing area at the time of the deballasting operation.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DESCRIPTION OF SPECIFIC EMBODIMENTS

Exemplary embodiments of a ballast water treatment operating apparatus and method according to the present invention will be described in detail below with reference to the accompanying drawings. For reference, in relation with the description of the present invention, as the terms indicating constituent elements of the present invention are named in consideration of the function of the respective constituent elements, they will not be understood as the meaning of limitation of technical constituent elements of the present invention.

Figure 1:
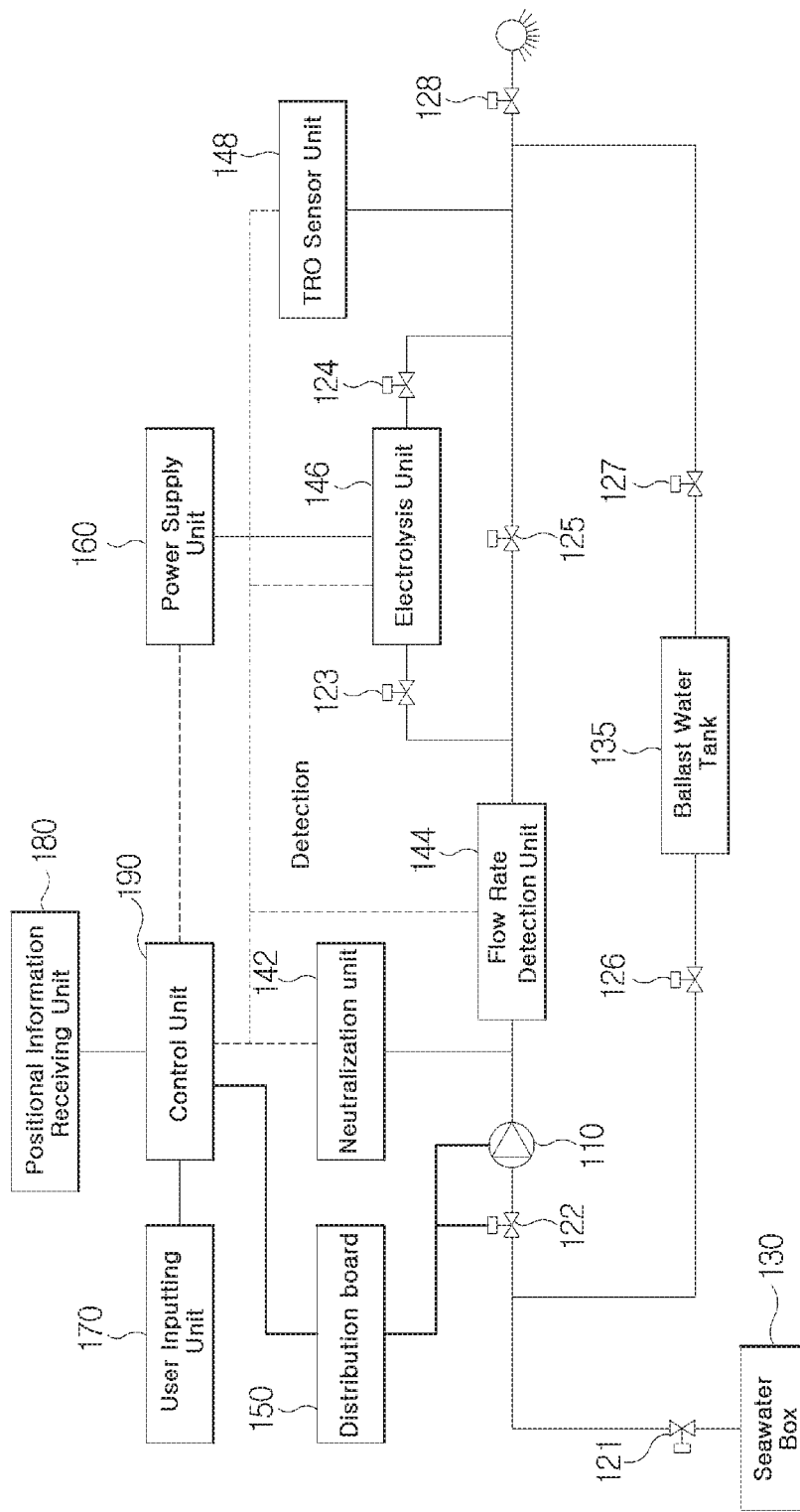
FIG. 1 illustrates schematically a block diagram of a ballast water treatment operating apparatus according to one embodiment of the present invention.

FIG. 1 illustrates schematically a block diagram of a ballast water treatment operating apparatus according to one embodiment of the present invention.

As illustrated in FIG. 1, a ballast water treatment operating apparatus includes a pump 110 for intaking ballast water; a ballast water tank 135 for storing ballast water; and a first valve 121, a second valve 122, a third valve (ECU intake valve) 123, a fourth valve (ECU discharge valve), a fifth valve (bypass valve) 125, a sixth valve (tank discharge valve) 126, a seventh valve (tank intake valve) 127 and a eighth valve (deballast discharge valve) 128 for controlling the flow rate of ballast water.

In addition, the ballast water treatment operating apparatus includes a plurality of units related with a ballast water treatment. To this end, the ballast water treatment operating apparatus includes an electrolysis unit (ECU) 146 for electrolyzing ballast water; a neutralization unit 142 for neutralizing TRO remaining in ballast water discharged during a deballast operation; a TRO sensor unit 148 for measuring TRO remaining in ballast water during a ballast or deballast operation; a flow rate detection unit 144 for detecting a flow during a ballast or deballast operation; and a power supply unit 160 for supplying a power to the above units.

The term "TRO" used in this invention means the total residual oxidant existing in ballast water and is generally obtained by measuring a residual chlorine value of chlorine remained after chlorine generated via an electrolysis process oxidizes aquatic organisms within ballast water. In case seawater or salt water is electrolyzed or chlorine-sterilized, several kinds of oxidants coexist as a result of replacement of active chlorines by atoms such as bromine. The TRO indicates all active oxidants existing at this time.

The ballast water treatment operating apparatus also includes a pump 110; a distribution board 150 for providing a state signal for each operation of a plurality of valves; a user inputting unit 170 operable to receive a user input; a positional information receiving unit 180 operable to communicate with a satellite; and a control unit 190 operable to communicate with and control the above units, wherein the control unit may comprise a personal computer and the like. Herein the state signal of each valve means a state information detected according to operation of the pump 110 or each valve. For example, in case a limit switch is provided at each valve, a state signal of each valve may be a state-on signal when the valve is open.

The positional information receiving unit 180 may include a GPS satellite communication module to receive positional information, and may also receive positional information directly from a user. The positional information receiving unit 180 may receive an operational condition updated through communication with an artificial satellite in case the positional information receiving unit 180 is provided with a satellite communication module.

In the present invention the control unit 190 confirms a position as to a ship's latitude and longitude by using positional information received from the positional information receiving unit 180 when a ballast operation is to be performed. The control unit 190 performs a ballast operation without operating the electrolysis unit 146 if a ship's position is located in an area in which the electrolysis unit 146 does not need to be operated. However, the control unit 190 operates the electrolysis unit 146 during a ballast operation if a ship's position is located in an area in which the electrolysis unit 146 has to be operated.

In addition, the control unit 190 confirms a position as to a ship's latitude and longitude by using positional information received from the positional information receiving unit 180 when a deballast operation is to be performed. The control unit 190 performs a deballast operation without operating the neutralization unit 142 if a ship's position is located in an area in which the neutralization unit 142 does not need to be operated. However, the control unit 190 operates the neutralization unit 142 during a ballast operation if a ship's position is located in an area in which the neutralization unit 142 has to be operated.

To this end, the control unit 190 may further include a memory (not shown). In the memory are stored an operational condition as to whether to operate the electrolysis unit 146 during a ballast operation and an operational condition as to whether to operate the neutralization unit 142 necessary during a deballast operation.

Thus, the control unit 190 determines whether to operate the electrolysis unit 146 according to the operational condition stored in the memory when a ballast operation is to be performed and determines whether to operate the neutralization unit 142 according to the operational condition stored in the memory when a deballast operation is to be performed.

The condition by which the control unit 190 determines whether to perform an operation includes (1) whether the area where a ballast operation is performed is the same as that where a deballast operation is performed; (2) whether the area where a ballast or deballast operation is performed is under the Mutual Exemption Agreement and the like. During a ballast operation, the control unit 190 does not operate the electrolysis unit 146 if the area where a ballast operation is performed is the same as that where a deballast operation is performed or if the area where a ballast operation is performed is under the Mutual Exemption Agreement. In case the area where a ballast operation is performed is the same as that where a deballast operation is performed, there is no need to operate deliberately the electrolysis unit 146 during a ballast operation and also to operate deliberately the neutralization unit 142 during a deballast operation.

In addition, in case of agreeing that the application of 'the ballast water management convention' is exempted, like the areas under the Mutual Exemption Agreement, for example like Korea and Japan, there is also no need to operate deliberately the electrolysis unit 146 during a ballast operation and also to operate deliberately the neutralization unit 142 during a deballast operation.

Also, the control unit 190 may store in a memory an updated operational condition received at the positional information receiving unit 180.

Figure 2:
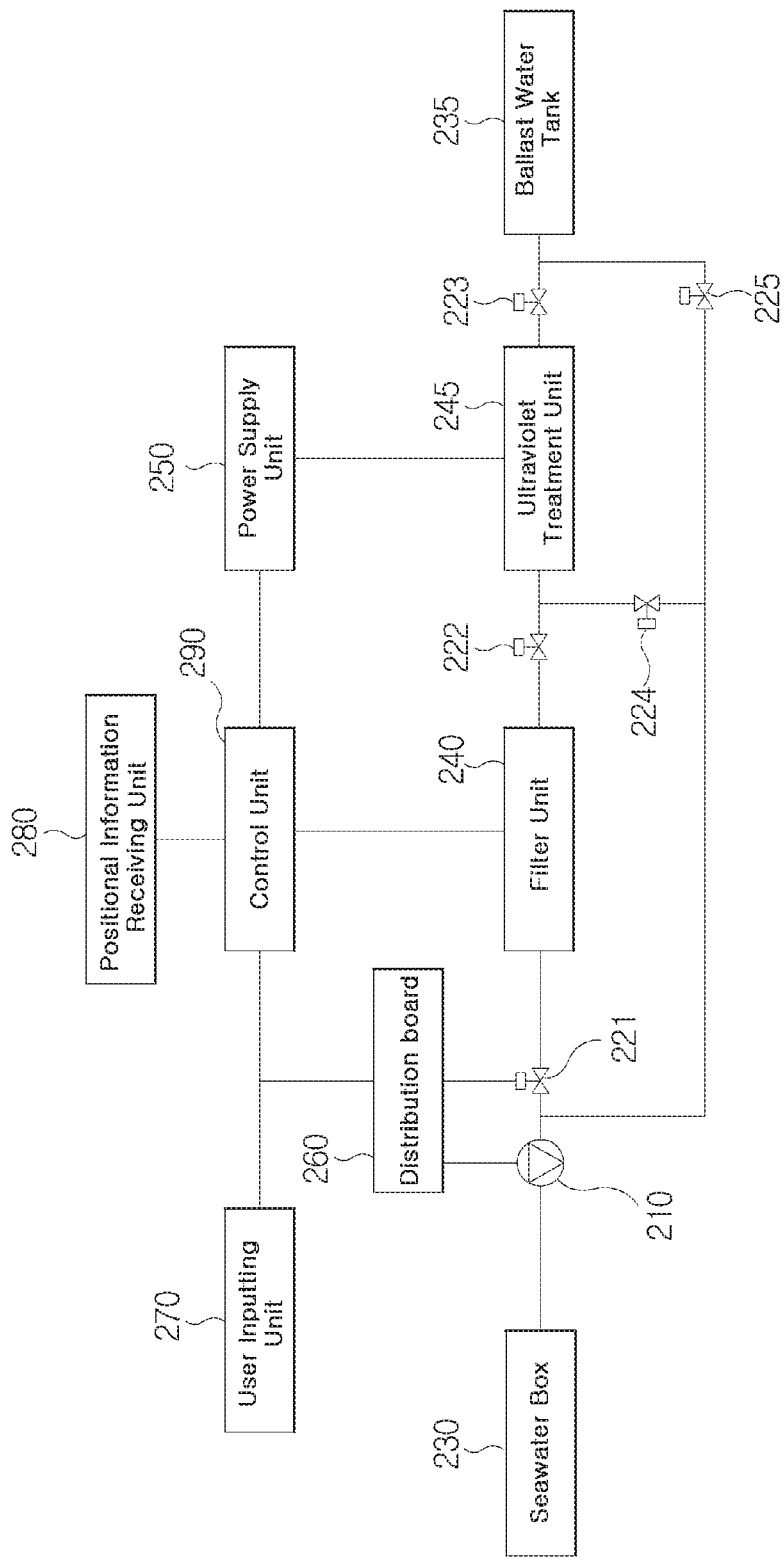
FIG. 2 illustrates schematically a block diagram of a ballast water treatment operating apparatus according to another embodiment of the present invention.

FIG. 2 illustrates schematically a block diagram of a ballast water treatment operating apparatus according to another embodiment of the present invention.

As shown in FIG. 2, a ballast water treatment operating apparatus includes a pump 210 for intaking ballast water; a ballast water tank 235 for storing ballast water; and a first valve 221, a second valve 222, a third valve 223, a fourth valve 224 and a fifth valve 225 for controlling the flow rate of ballast water.

In addition, the ballast water treatment operating apparatus includes a plurality of units related with a ballast water treatment. To this end, the ballast water treatment operating apparatus includes a filter unit 240 for filtering detrimental substances, etc., of ballast water; a ultraviolet (UV) treatment unit 245 for performing UV treatment of ballast water; and a power supply unit 250 for supplying a power to the above units.

The ballast water treatment operating apparatus also includes a pump 210; a distribution board 260 for providing a state signal for each operation of a plurality of valves; a user inputting unit 270 operable to receive a user input; a positional information receiving unit 280 operable to communicate with a satellite; a control unit 290 operable to communicate with and control the above units, wherein the control unit may comprise a personal computer and the like. Herein the state signal of each valve means a state information detected according to operation of the pump 210 or each valve. For example, in case a limit switch is provided at each valve, a state signal of each valve may be a state-on signal when the valve is open.

The positional information receiving unit 280 may include a GPS satellite communication module to receive positional information, and may also receive positional information directly from a user. The positional information receiving unit 280 may receive an operational condition updated through communication with an artificial satellite in case the positional information receiving unit 180 is provided with a satellite communication module.

The positional information receiving unit 280 includes GPS which receives positional information. In addition, the positional information receiving unit 280 may receive an operational condition updated through communication with an artificial satellite.

In the present invention the control unit 290 confirms a position as to a ship's latitude and longitude by using positional information received from the positional information receiving unit 280 if a ballast operation is to be performed. The control unit 290 performs a ballast operation without operating an ultraviolet treatment unit 245 if a ship's position is located in an area in which the ultraviolet treatment unit 245 does not need to be operated. However, the control unit 290 operates the ultraviolet treatment unit 245 during a ballast operation if a ship's position is located in an area in which the ultraviolet treatment unit 245 has to be operated.

In addition, the control unit 290 confirms a position as to a ship's latitude and longitude by using positional information received from the positional information receiving unit 280 when a deballast operation is to be performed. The control unit 290 performs a deballast operation without operating the ultraviolet treatment unit 245 if a ship's position is located in an area in which the ultraviolet treatment unit 245 does not need to be operated. However, the control unit 290 operates the ultraviolet treatment unit 245 during a ballast operation if a ship's position is located in an area in which the ultraviolet treatment unit 245 has to be operated.

To this end, the control unit 290 may further include a memory (not shown). In the memory are stored an operational condition as to whether to operate the ultraviolet treatment unit 245 during a ballast operation and an operational condition as to whether to operate the ultraviolet treatment unit 245 necessary during a deballast operation.

Thus, the control unit 290 determines whether to operate the ultraviolet treatment unit 245 according to the operational condition stored in the memory when a ballast operation is to be performed and determines whether to operate the ultraviolet treatment unit 245 according to the operational condition stored in the memory when a deballast operation is to be performed.

In addition, the control unit 290 may store in a memory an updated operational condition received at the positional information receiving unit 280.

Meanwhile, the electrolysis unit, the neutralization unit or the ultraviolet treatment unit described in the above mentioned embodiments may be commonly called a ballast water treatment unit.

Figure 3:
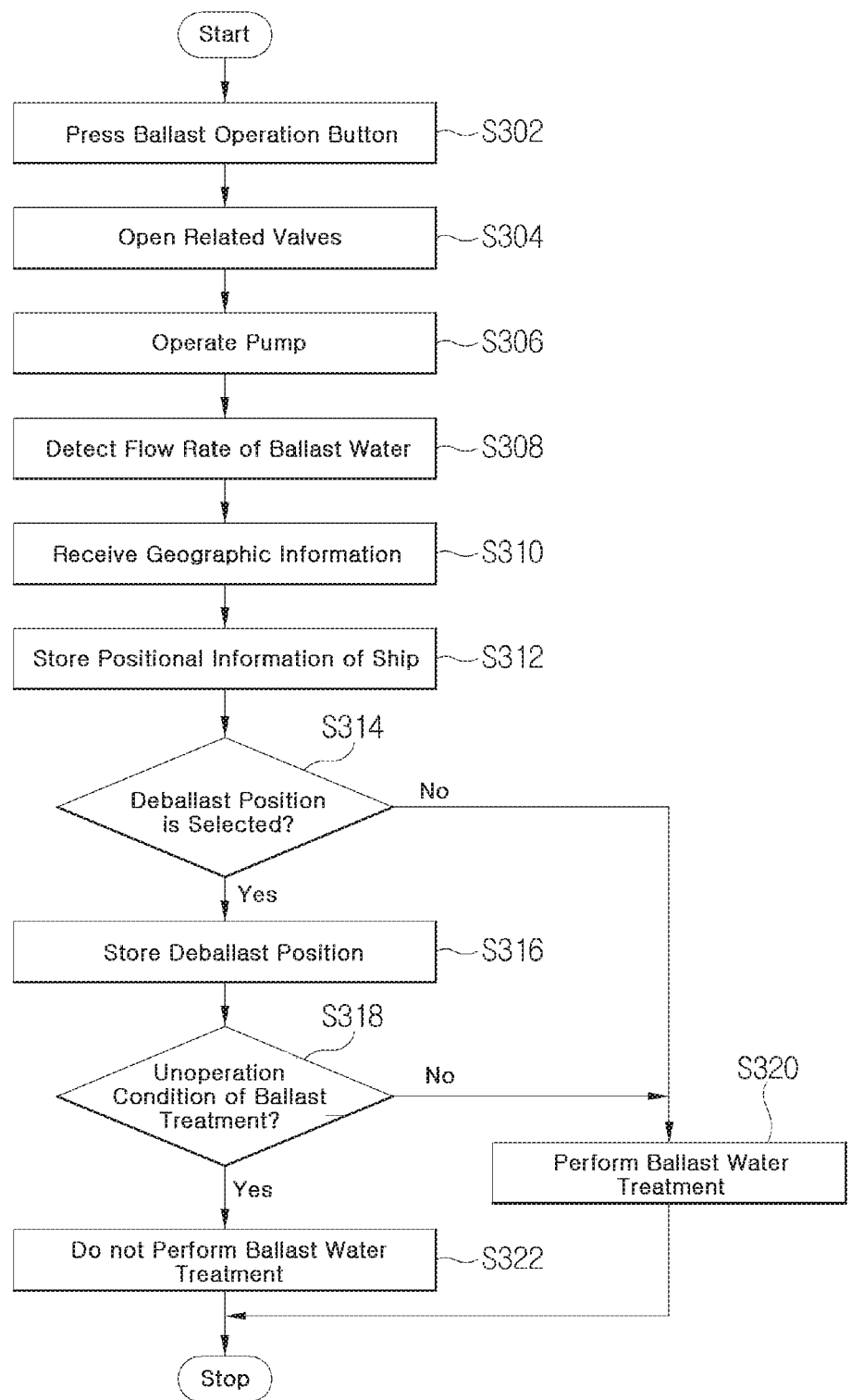
FIG. 3 is a flow chart of a ballast operation according to one embodiment of the present invention.

FIG. 3 is a flow chart of a ballast operation according to one embodiment of the present invention.

A crew may input a ballast operation instruction into a control unit 190 by pressing a ballast button (not shown) of a user inputting unit 170 when the crew is to proceed with a ballast operation (S302).

If the ballast operation instruction is inputted, in an embodiment of FIG. 1, first the control unit 190 controls a drive unit (not shown) such that a first valve 121, a second valve 122, a third valve 123, a fourth valve 124 and a seventh valve 127 are opened (S304). Thus the first valve 121, the second valve 122, the third valve 123, the fourth valve 124 and the seventh valve 127 may be operated to be opened, and a first valve state-on signal, a second valve state-on signal, a third valve state-on signal, a fourth valve state-on signal and a seventh valve state-on signal may be provided to a distribution board 160. In addition, a fifth valve state-off signal, a sixth valve state-off signal and a eighth valve state-off signal may also be provided to the distribution board 160.

Next, the control unit 190 may control the drive unit to operate a pump 110 (S306). According to an operation of the pump 110, a pump state-on signal may be provided to the distribution board 160.

As described above, all signal from the pump 110 or each valve have to be connected to the distribution board 160 so as to provide the distribution board 160 with a pump state signal and all valve state signals but this increases the cost. Therefore, it is preferable to provide the distribution board with some signals only necessary for a ballast operation and a deballast operation.

The control unit 190 may be configured to detect a flow rate of ballast water via a flow rate detection unit 144 if the pump 110 is operated (S308). The control unit 190 may determine that ballast water is flowing if a flow rate value obtained from the flow rate detection unit 144 is greater than or equal to a defined standard flow rate value, for example 500 m$^3$/h.

The control unit 190 receives positional information from the positional information receiving unit 180 (S310). The control unit 190 store in a memory positional information of a ship which is to perform a ballast operation (S312).

The control unit 190 checks whether a user selects a position to perform a deballast operation by manipulating a user inputting unit 170 (S314). The control unit 190 operates a ballast water treatment unit, that is the electrolysis unit 146 or the ultraviolet treatment unit 245 if a user does not select a position to perform a deballast operation (S320). Meanwhile, the control unit 190 may adjust a current supplied to the electrolysis unit 146 depending on a flow rate of ballast water detected by the flow rate detection unit 144. The control unit 190 may also measure a flow rate of ballast water by the flow rate detection unit 144 and control a current supplied to the electrolysis unit 146 such that a proper amount of TRO is generated by measuring TRO by the TRO sensor unit 148. The control unit 190 may control a flow rate of ballast water by controlling the pump 110 as necessary.

The control unit 190 may be configured to store a deballast position if a position to perform a deballast operation is selected by a user (S316). The control unit 190 checks whether to be the unoperation condition of a ballast treatment (S318). The control unit 190 operates a ballast water treatment unit, that is to say the electrolysis unit 146 or the ultraviolet treatment unit 245 if not being an unoperation condition of a ballast treatment (S320). The control unit 190 also performs a ballast operation without operating a ballast water treatment unit, that is the electrolysis unit 146 or the ultraviolet treatment unit 245 if an unoperation condition of a ballast treatment is satisfied (S322).

The control unit 190 may in particular stop operating the electrolysis unit 146 or the ultraviolet treatment unit 245 if a flow rate of ballast water is not detected at the flow rate detection unit 144 because the ballast water tank 135 is completely filled with ballast water.

Figure 4:
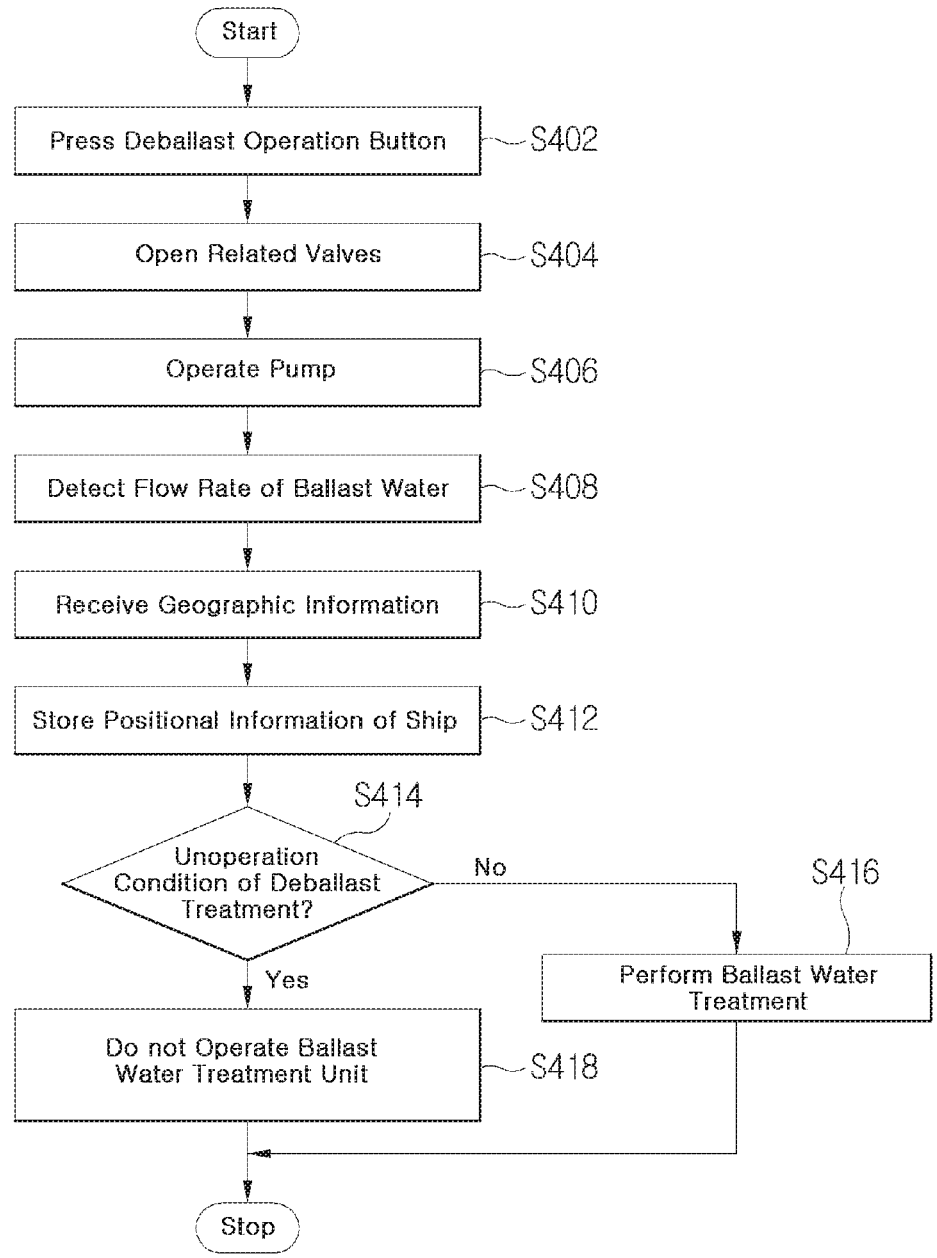
FIG. 4 is a flow chart of a deballast treatment operation according to another embodiment of the present invention.

FIG. 4 is a flow chart of a deballast treatment operation according to another embodiment of the present invention.

A crew may input a deballast operation instruction into a control unit 190 by pressing a deballast button (not shown) of a user inputting unit 170 when the crew is to proceed with a deballast operation (S402).

If the ballast operation instruction is inputted, in an embodiment of FIG. 1, first the control unit 190 controls a drive unit (not shown) such that a second valve 122, a fifth valve 125, a sixth valve 126 and a eighth valve 128 are opened (S404). Thus the second valve 122, the fifth valve 125, the sixth valve 126 and the eighth valve 128 may be operated to be opened, and a second valve state-on signal, a fifth valve state-on signal, a sixth valve state-on signal and a eighth valve state-on signal may be provided for a distribution board 160. In addition, a first valve state-off signal, a third valve state-off signal, a fourth valve state-off signal and a seventh valve state-off signal may also be provided to the distribution board 160.

Next, the control unit may control the drive unit to operate the pump 110 (S406). According to an operation of the pump 110, a pump state-on signal may be provided to the distribution board 160.

The control unit 190 detects a flow rate of ballast water via a flow rate detection unit 144 if the pump 110 is operated (S408).

The control unit 190 receives positional information from the positional information receiving unit 180 (S410). The control unit 190 store in a memory positional information of a ship which is to perform a deballast operation (S412).

The control unit 190 checks whether to be an unoperation condition of a deballast treatment (S414). The control unit 190 operates a ballast water treatment unit, that is to say the neutralization unit 142 or the ultraviolet treatment unit 245 if not being an unoperation condition of a deballast treatment (S416), and performs a deballast operation without operating a ballast water treatment unit, that is to say the neutralization unit 142 or the ultraviolet treatment unit 245 if an unoperation condition of a deballast treatment is satisfied (S418).

The control unit 190 may in particular stop operating the neutralization unit 142 or the ultraviolet treatment unit 245 if a flow rate of ballast water is not detected at the flow rate detection unit 144 because the ballast water tank 135 is completely empty of ballast water.

The ballast water treatment operating apparatus may include a stride operation, a gravity ballast operation and a gravity deballast operation and the like, other than the above mentioned operation conditions and may also be provided with a selection switch manually operable by the manipulation of a crew. In addition, the ballast water treatment operating apparatus may store a log such as operation records, that is to say a flow rate and a treatment concentration.

Embodiments of the present invention described above are simply illustrative of the technical concept of the present invention and the protective scope of the present invention should be interpreted by the appended claims. In addition, it will be apparent to those skilled in the art that various modifications and alterations can be made without departing from the essential features of the present invention. Thus, all technical concepts within the equivalent scope to the present invention should be interpreted to be included within the protective scope of the present invention.

What is claimed is:

1. A ballast water treatment operating apparatus comprising:
   a ballast water treatment unit for performing a certain treatment of a ballast water flowing in from the outside for a ballast operation or performing a certain treatment of ballast water discharged into the outside for a de-ballast operation;
   a positional information receiving unit for receiving positional information; and
   a control unit for confirming a ship's position from the positional information received from the positional information receiving unit during the ballast operation or during the de-ballast operation and then determining whether to operate the ballast water treatment unit in accordance with a predetermined operating condition,
   wherein the control unit does not operate the ballast water treatment unit when
      an area where the ballast operation is performed is the same as an area where de-ballast operation is performed, or
      the area where the ballast operation performed and the area where de-ballast operation is performed are under a Mutual Exemption Agreement stating that an application of a Ballast Water Management Convention is mutually exempted.

2. The ballast water treatment operating apparatus of claim 1, wherein the control unit comprises a memory for storing a position to perform the ballast operation, and wherein the control unit stores in the memory the position to perform the ballast operation during the ballast operation and, in consideration of a ballast operation performing area stored in the memory at the time of the ballast operation, determines whether to operate the ballast water treatment unit.

3. The ballast water treatment operating apparatus of claim 2, wherein an operational condition of the ballast water treatment unit required during the ballast operation or during the de-ballast operation is stored in the memory, and wherein the control unit is configured to determine whether to operate the ballast water treatment unit according to the operational condition stored in the memory during the ballast operation or during the de-ballast operation.

4. The ballast water treatment operating apparatus of claim 3, wherein if an updated operational condition of the ballast water treatment unit is inputted via the positional information receiving unit, the control unit is configured to store the updated operational condition of the ballast water treatment unit in the memory.

5. The ballast water treatment operating apparatus of claim 1, wherein the ballast water treatment unit comprises an electrolysis unit for being capable of electrolyzing the ballast water flowing in from the outside during the ballast operation; and a neutralization unit for neutralizing residual oxidants remaining in ballast water discharged into the outside during the de-ballast operation, and
wherein the control unit is configured to control the electrolysis unit by determining whether to operate the electrolysis unit during the ballast operation and is also configured to control the neutralization unit by determining whether to operate the neutralization unit during the de-ballast operation.

6. The ballast water treatment operating apparatus of claim 1, wherein the ballast water treatment unit comprises an ultraviolet treatment unit for performing an ultraviolet sterilization treatment of ballast water flowing in from the outside during the ballast operation or of ballast water discharged into the outside during the de-ballast operation, and
wherein the control unit is configured to control the ultraviolet treatment unit by determining whether to operate the ultraviolet treatment unit during a ballast operation and during a de-ballast operation.

7. A ballast water treatment operating method comprises the steps of:
receiving first positional information from a positional information receiving unit while performing a ballast operation if a ballast operating button is inputted via a user inputting unit;
confirming whether second positional information as to a position to perform a de-ballast operation via the user inputting unit is inputted;
determining whether an area where the ballast operation is performed is the same as an area where the de-ballast operation is performed, or whether the area where the ballast operation is performed and the area where the de-ballast operation is performed are under the Mutual Exemption Agreement, by using the first position information and the second position information; and
not operating a ballast water treatment unit so as not to perform a predetermined process on ballast water flowing in from the outside when
the area where the ballast operation is performed is the same as the area where the de-ballast operation is performed, or
the area where the ballast operation is performed and the area where the de-ballast operation is performed are under a Mutual Exemption Agreement stating that an application of a Ballast Water Management Convention is mutually exempted.

8. The method of claim 7, further comprising the steps of:
receiving a second positional information from the positional information receiving unit if a de-ballast operating button is inputted via a user inputting unit; and
performing a certain treatment of ballast water discharged into the outside by operating the ballast water treatment unit if an operational condition of the ballast water treatment unit is satisfied in consideration of the second positional information received from the positional information receiving unit and the first positional information stored in a memory.

9. The ballast water treatment operating apparatus of claim 2, wherein the ballast water treatment unit comprises an electrolysis unit for being capable of electrolyzing the ballast water flowing in from the outside during the ballast operation; and a neutralization unit for neutralizing residual oxidants remaining in ballast water discharged into the outside during the de-ballast operation, and
wherein the control unit is configured to control the electrolysis unit by determining whether to operate the electrolysis unit during the ballast operation and is also configured to control the neutralization unit by determining whether to operate the neutralization unit during the de-ballast operation.

10. The ballast water treatment operating apparatus of claim 3, wherein the ballast water treatment unit comprises an electrolysis unit for being capable of electrolyzing the ballast water flowing in from the outside during the ballast operation; and a neutralization unit for neutralizing residual oxidants remaining in ballast water discharged into the outside during the de-ballast operation, and
wherein the control unit is configured to control the electrolysis unit by determining whether to operate the electrolysis unit during the ballast operation and is also configured to control the neutralization unit by determining whether to operate the neutralization unit during the de-ballast operation.

11. The ballast water treatment operating apparatus of claim 4, wherein the ballast water treatment unit comprises an electrolysis unit for being capable of electrolyzing the ballast water flowing in from the outside during the ballast operation; and a neutralization unit for neutralizing residual oxidants remaining in ballast water discharged into the outside during the de-ballast operation, and
wherein the control unit is configured to control the electrolysis unit by determining whether to operate the electrolysis unit during the ballast operation and is also configured to control the neutralization unit by determining whether to operate the neutralization unit during the de-ballast operation.

12. The ballast water treatment operating apparatus of claim 2, wherein the ballast water treatment unit comprises an ultraviolet treatment unit for performing an ultraviolet sterilization treatment of ballast water flowing in from the outside during the ballast operation or of ballast water discharged into the outside during the de-ballast operation, and
wherein the control unit is configured to control the ultraviolet treatment unit by determining whether to operate the ultraviolet treatment unit during a ballast operation and during a de-ballast operation.

13. The ballast water treatment operating apparatus of claim 3, wherein the ballast water treatment unit comprises an ultraviolet treatment unit for performing an ultraviolet sterilization treatment of ballast water flowing in from the outside during the ballast operation or of ballast water discharged into the outside during the de-ballast operation, and wherein the control unit is configured to control the ultraviolet treatment unit by determining whether to operate the ultraviolet treatment unit during a ballast operation and during a de-ballast operation.

14. The ballast water treatment operating apparatus of claim 4, wherein the ballast water treatment unit comprises an ultraviolet treatment unit for performing an ultraviolet sterilization treatment of ballast water flowing in from the outside during the ballast operation or of ballast water discharged into the outside during the de-ballast operation, and wherein the control unit is configured to control the ultraviolet treatment unit by determining whether to operate the ultraviolet treatment unit during a ballast operation and during a de-ballast operation.

* * * * *